United States Patent [19]

Watanabe

[11] Patent Number: 4,520,906
[45] Date of Patent: Jun. 4, 1985

[54] CONTROL APPARATUS FOR ELEVATOR
[75] Inventor: Eiki Watanabe, Inazawa, Japan
[73] Assignee: Mitsubishi Denki Kabushiki Kaisha, Japan
[21] Appl. No.: 627,653
[22] Filed: Jul. 3, 1984
[30] Foreign Application Priority Data
  Jul. 6, 1983 [JP] Japan ............................... 58-122615
[51] Int. Cl.³ ............................................... B66B 1/32
[52] U.S. Cl. ................................... 187/29 R; 318/765
[58] Field of Search ................ 187/29; 318/303, 382, 318/629, 765

[56] References Cited
U.S. PATENT DOCUMENTS 2,846,631  8/1958  Vogt ..................................... 318/765
3,345,548  10/1967 Grepe ............................. 318/765 X
3,802,274  1/1974  Berkovitz .
4,027,745  6/1977  Watanabe .......................... 187/29 R
4,030,570  6/1977  Caputo ............................... 187/29 R
4,269,286  5/1981  Ishii et al. .......................... 187/29 R
4,271,931  6/1981  Watanabe .......................... 187/29 R Primary Examiner—Stanley J. Witkowski
Assistant Examiner—W. E. Duncanson, Jr.
Attorney, Agent, or Firm—Leydig, Voit, Osann, Mayer and Holt, Ltd.

[57] ABSTRACT

A control apparatus for an elevator comprising loss impartation means to impart a loss to a hoisting machine for a cage; cage position detection means to detect the position of the cage; and control means to control the loss impartation means on the basis of an output signal of the cage position detection means so as to adjust the loss in accordance with the position of the cage; wherein by adjusting and controlling the loss, the resonance of a mechanical system composed of the cage, a balance weight, a hoisting rope, etc., is suppressed to improve riding conditions in the elevator car.

15 Claims, 11 Drawing Figures

CONTROL APPARATUS FOR ELEVATOR

BACKGROUND OF THE INVENTION

The present invention relates to a control apparatus for an elevator in which a cage is driven by an A.C. electric motor, and more particularly to the prevention of vibrations of the cage.

FIG. 1 is a block diagram showing the arrangement of a control apparatus for a conventional elevator in which a cage is driven by an induction motor, along with a mechanical system including the cage. A three-phase power source 1 has a converter for power running 2 and a converter for regenerative braking 3 connected in parallel therewith, a smoothing capacitor 4 and an inverter 5 are connected in parallel across the output terminals of these converters, and an induction motor 6 is connected to the inverter 5. Although, in FIG. 1, only a circuit corresponding to one phase of a three-phase alternating current is illustrated for any of the converters 2 and 3 and the inverters 5 similar such circuits are actually connected in parallel for the three phases. Coupled to the induction motor 6 are a tachometer generator 7 which serves as a speed detector and a sheave 8. A brake 9 is disposed on the outer side of the sheave 8, round which a hoisting rope 12 is extended. A cage 10 is coupled to one end of this hoisting rope, and a balance weight 11 to the other end.

On the other hand, in order to detect the position of the cage 10, a governor rope 16 is wound round a governor 14 comprising a pulse generator 15. The governor rope 16 has its ends joined to the upper end part and lower end part of the cage 10, respectively, and is subjected to a tension by a tightening pulley 17.

In addition, in order to control the aforementioned converters 2, 3 and inverter 5, a voltage/frequency control unit (hereinbelow, simply termed "control unit") 13 is disposed, which is supplied with the speed signal of the cage 10 detected by the tachometer generator 7 and the pulse signal of the pulse generator 15 for detecting the position of the cage. The control unit 13 is constructed of a microprocessor (CPU), an interface (I/F), a random access memory (RAM), a read only memory (ROM), etc.

In the arrangement of FIG. 1, during the power running mode of operation, a three-phase A.C. voltage is converted into a D.C. voltage by the converter for power running 2, and the D.C. voltage is smoothed by the capacitor 4 and then applied to the inverter 5. Here, when the control unit 13 controls the inverter 5 in accordance with the pulse width modulation (PWM) system, an A.C. voltage of any desired frequency and voltage values is produced from the inverter 5. Such control is called the variable-voltage and variable-frequency control (VVVF control). Here, when the control unit 13 controls the inverters 5 in a phase sequence corresponding to the operating direction of the elevator, the induction motor 6 is started in a direction conforming to the phase sequence, and the cage 10 begins to run. Thenceforth, the signals of the tachometer generator 7 and the pulse generator 15 are fed to the control unit 13, so that the running control is done in the state in which position feedback is always applied.

In the elevator of this sort, as the cage rises higher, the resonance frequency of the mechanical resonance system including the cage 10, balance weight 11, hoisting rope 12, etc., becomes lower, and the speed control system becomes easier to oscillate because the vibrations of the mechanical system change the output signal of the tachometer generator 7 and interfere with the speed control system.

This is attributed to the fact that the natural frequency of the mechanical system which is constructed of the sheave 8, cage 10, balance weight 11 and hoisting rope 12 becomes close to the cutoff frequency of the motor control system. When the gain of the speed control system has increased near the natural frequency of the mechanical system, oscillations occur if the speed control system itself has no phase margin.

Such oscillations violently vibrate the cage 10 in the vertical direction, and, accordingly, does not provide a good ride. Even in a case where the oscillation is not reached, the control system becomes sensitive to a disturbance because of the increased gain of the whole control system. As a result, even a slight torque ripple of the induction motor 6 cannot be suppressed, and vibrations which disturb the riding conditions of passengers arise.

Since, in this case, the induction motor 6 is driven by the inverters 5, a torque ripple of $6 \cdot n \cdot f$ ($n = 1, 2, 3, \ldots$) where f denotes the output frequency of the inverters 5 develops in the induction motor 6, to lead to the situation in which the foregoing oscillation is liable to occur.

Here, a large number of vibrational aspects are predicted as to the mechanical system. Particularly problematic due to a slow attenuation is the vibrational aspect in which the cage 10 and the balance weight 11 are substantially at a stop, with only the seave 8 rotating violently.

FIG. 2 shows an equivalent model for analyzing the vibrations of the mechanical system. Symbol $M_1$ indicates the mass of the cage 10, symbol $M_2$ the equivalent combined mass of the induction motor 6 and the sheave 8, symbol $M_3$ the mass of the balance weight 11, symbol $K_1$ the spring constant of the cage side rope 12A, symbol $K_2$ the spring constant of the balance weight side rope 12B, symbol $C_1$ the attenuation constant of the cage side rope 12A, and symbol $C_2$ the attenuation constant of the balance weight side rope 12B.

Assuming that the cage 10 and the balance weight 11 be substantially at a stop, this equivalent model can be substituted by an equivalent model which is fixed at both the ends as illustrated in FIG. 3.

In the equivalent model of FIG. 3, letting $x_2$ denote the variation of the mass $M_2$ from the equilibrium point thereof, the following equation of motion approximately holds:

$$M_2 \cdot \ddot{x}_2 + (C_1 + C_2) \cdot \dot{x}_2 + (K_1 + K_2) \cdot x_2 = 0 \qquad (1)$$

When the attenuation constant $(C_1 + C_2)$ of the second term in Equation (1) is set to be large, naturally the sharpness of resonance lowers. As a practicable method, therefore, it has been proposed to indirectly damp the rope system (refer to the official gazette of Japanese Utility Model Registration Application Publication No. 56-4701).

Since, however, this method applies indirect damping to the rotating mode of the sheave 8 through the rope, it has not always achieved a great effect.

As another method, there is proposed a damper of Lanchester which is disposed for the rotating mode of the sheave 8. This method, however, has had the disadvantages that the apparatus becomes large in size and that a mechanical loss is always involved.

SUMMARY OF THE INVENTION

The present invention has been made in view of the above circumstances, and has for its object to provide a control apparatus for an elevator in which the optimum damping can be applied while the mechanical loss is suppressed.

In order to accomplish the above mentioned object, a control apparatus for an elevator comprises, as illustrated in FIG. 9 corresponding to a claim, loss impartation means to impart a loss to a hoisting machine for a cage and capable of adjusting the loss, cage position detection means to detect the position of the cage, and control means to control the loss impartation means on the basis of an output signal of the cage position detection means so as to adjust the loss in accordance with the position of the cage.

Further, a control apparatus for an elevator wherein a hoisting machine for a cage is controlled by a variable-voltage and variable-frequency power source comprises, as illustrated in FIG. 10, loss impartation means capable of imparting a loss to the hoisting machine, decision means to decide whether or not an output frequency of the variable-voltage and variable-frequency power source is close to the resonance frequency of a rope system for suspending the cage, and control means to control the loss impartation means into a loss imparting state when the output frequency of the variable-voltage and variable-frequency power source is close to the resonance frequency of the rope system on the basis of a decision result of the decision means.

Still further, a control apparatus for an elevator comprises, as illustrated in FIG. 11, loss impartation means capable of imparting a loss to a hoisting machine for a cage, acceleration detection means to detect an acceleration of the cage, and control means to control the loss impartation means on the basis of an output signal of the acceleration detection means so as to suppress vibrational components due to the acceleration to a minimum magnitude.

DESCRIPTION OF THE PREFERRED EMBODIMENTS

Referring now to the accompanying drawings, vibrations which arise in an elevator will be analyzed, and a number of embodiments of the present invention will be described.

Figure 3:
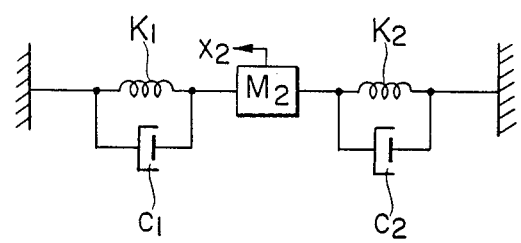
Figure 4:
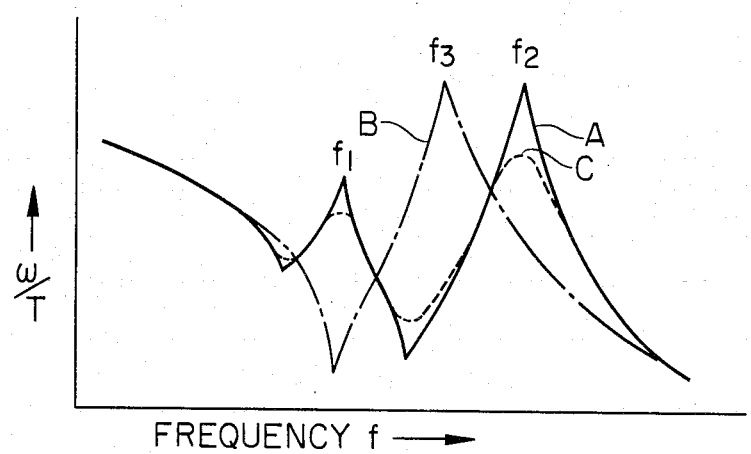
FIG. 4 is a graph showing the relationship between the vibrations and frequencies of the mechanical system.

Although, in the foregoing description, the simplified model as shown in FIG. 3 has been employed in order to facilitate understanding, actually the elevator vibrates in accordance with characteristics illustrated in FIG. 4.

More specifically, $\omega$ denotes the angular velocity of the sheave 8 and T the output torque of the induction motor 6 exerted on this sheave 8, $\omega/T$ expressed in logarithmic values (in dB) is taken along the ordinate axis, and the frequency f is taken along the abscissa axis. A sagging characteristic on the order of 20 [dB/dec] is exhibited in a low frequency region, and resonance points appear in due course. In this case, when the cage 10 approaches the uppermost floor, the resonance points are respectively demonstrated at frequencies $f_1$ and $f_2$ as indicated by a curve A of a solid line. Of these frequencies, the frequency $f_2$ is the resonance frequency which is derived from the equivalent model in FIG. 3. In addition, when the cage 10 approaches the lowermost floor, the sharpness of resonance somewhat lowers and the resonance frequencies deviate slightly, as indicated by a curve C of a broken line. It holds, however, that the two resonance points are demonstrated.

On the other hand, when the cage 10 is near a middle floor, a resonance point is demonstrated at a frequency $f_3$ between the frequencies $f_1$ and $f_2$ as indicated by a curve B of a dot-and-dash line.

It can accordingly be seen from FIG. 4 that the comfort of riders in the cage 10 worsens when the cage 10 lies above the middle floor.

Figure 1:
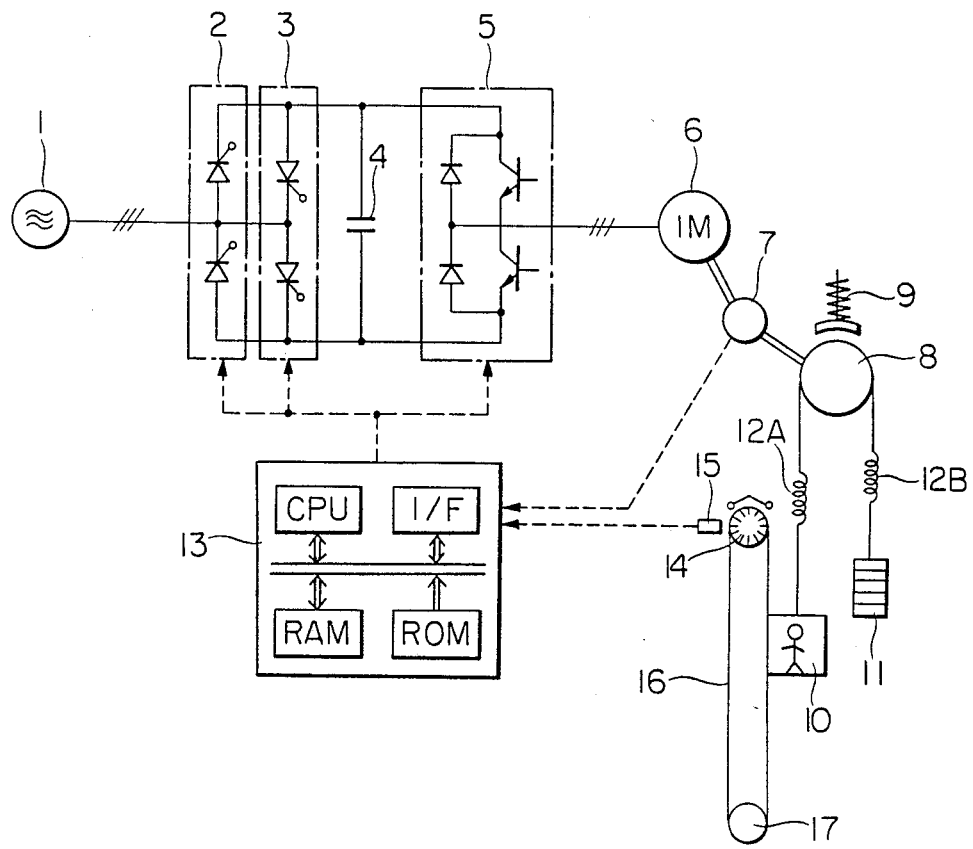
FIG. 1 is a block diagram showing the arrangement of a control apparatus for a conventional elevator in which a cage is driven by an induction motor, along with a mechanical system including the cage.
Figure 2:
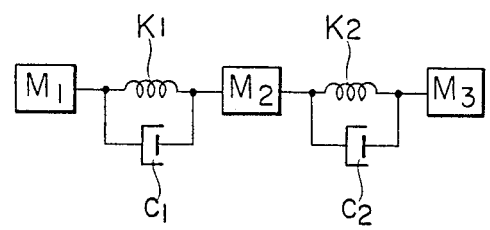
FIGS. 2 and 3 are diagrams showing equivalent models for analyzing the vibrations of the mechanical system of the conventional elevator.
Figure 5:
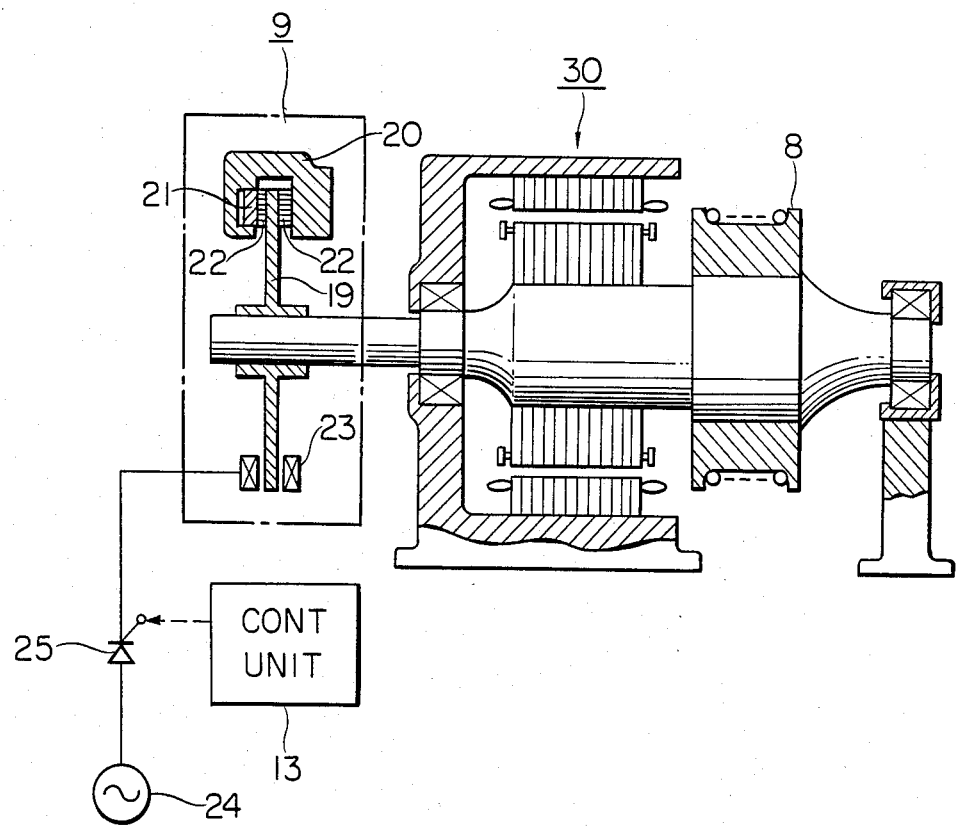
FIG. 5 is a connection diagram showing the arrangement of a first embodiment of a control apparatus for an elevator, along with a controlled system.

FIG. 5 shows the arrangement of a control apparatus for an elevator according to a first embodiment, along with a hoisting machine which is a controlled system. The hoising machine 30 is of the gearless type, and the induction motor 6, sheave 8 and brake 9 shown in FIG. 1 are substantially combined unitarily therein. Among the constituents, the brake 9 comprises a disc 19 which is fixed at the axial end of a shaft 18, a brake portion 20 which includes callipers 21 and which presses the disc 19 along both of its sides through brake pads 22 under the action of the callipers 21, and a pair of electromagnets 23 which are respectively arranged in proximity to both the sides of the disc 19. The electromagnets 23 are connected to a single-phase A.C. power source 24 through a thyristor 25, and this thyristor 25 is controlled by the control unit 13 stated before.

Here, when the control unit 13 controls the thyristor 25, the electromagnets 23 are energized to generate an eddy current in the disc 19, with the result that the hoisting machine 30 is damped. On this occasion, when the electromagnets 23 are normally energized, a heavy loss occurs. It is therefore desirable to energize them only in the situation during which the vibrations are apt to develop as illustrated in FIG. 4.

Figure 6:
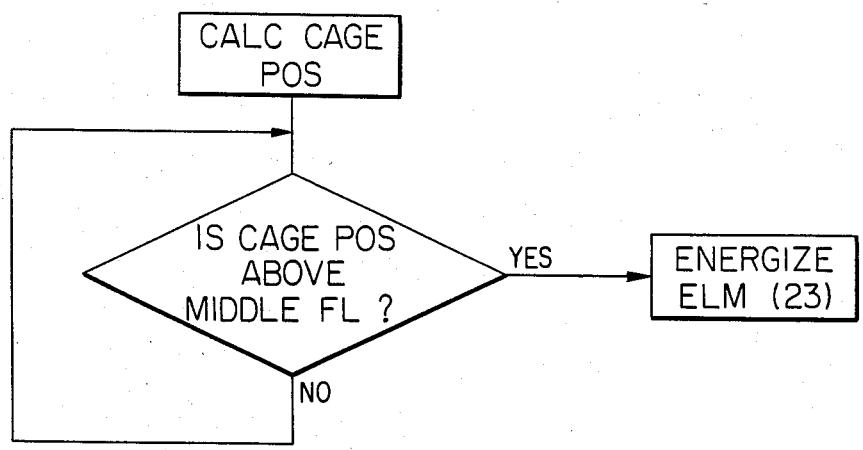
FIG. 6 is a flow chart for explaining the operation of the embodiment.

As shown in a flow chart of FIG. 6, the control unit 13 calculates the position of the cage on the basis of the signal of the pulse generator 15, and it subsequently decides whether or not the cage position is above the middle floor. When the cage position is above the middle floor, the electromagnets 23 are energized. In this case, the vibrations of the cage can be effectively prevented by controlling the energizing current so that it is null or low when the position of the cage is at and below the middle floor and increasing the current when the cage is beyond the middle floor, thereby controlling the power loss.

Figure 7:
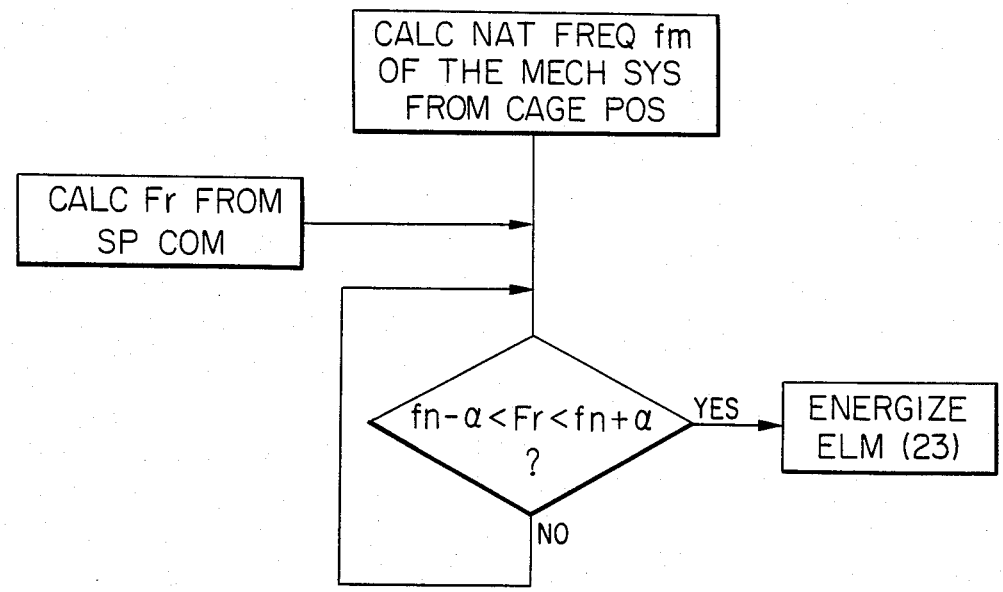
FIG. 7 is a flow chart for explaining the operation of a second embodiment.

Next, a second embodiment which also adopts the arrangement shown in FIG. 5, but differs in the control content of the control unit 13 will be discussed herebelow. In this case, as indicated by a flow chart in FIG. 7, the control unit 13 calculates the natural frequency $f_n$ of the mechanical system as a function of the position of the cage on the basis of the signal from the pulse generator 15, and it calculates the frequency $F_r$ of the torque ripple of the motor from a speed command applied to this control unit 13. Subsequently, it decides whether or not the deviation between the natural frequency $f_n$ and the frequency $F_r$ of the torque ripple is greater than a predetermined value $\alpha$, that is, whether or not the output frequency of the power source for driving the motor is near the resonance frequency of the rope system for suspending the cage. In the state in which both the frequencies are proximate and the vibrations are prone to occur, the electromagnets 23 are energized.

The above methods are the so-called feed forward control, and the effect might decrease when the natural frequency of the rope system involves a secular change etc.

Figure 8:
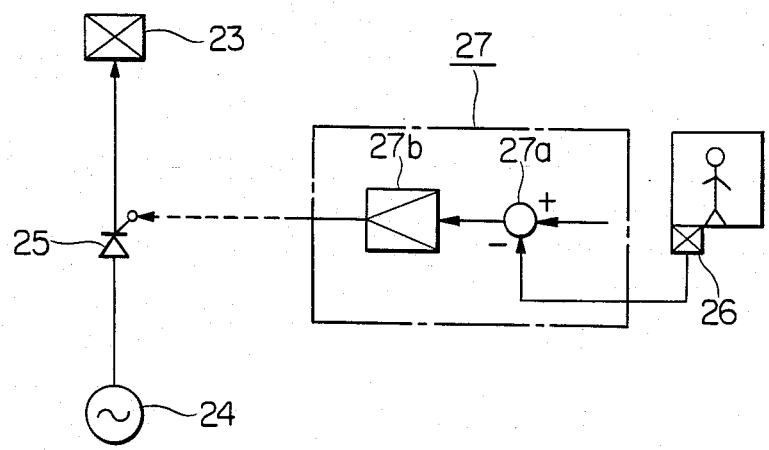
FIG. 8 is a connection diagram showing the arrangement of a third embodiment.
Figure 9:
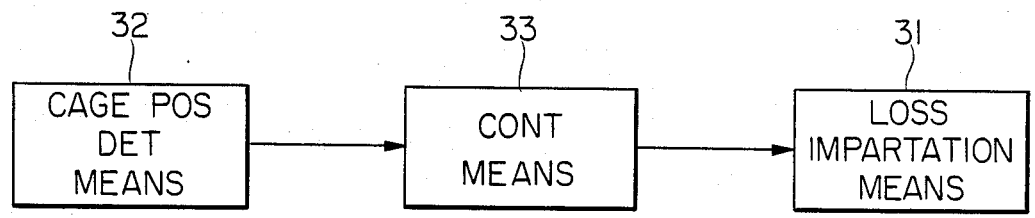
FIGS. 9, 10 and 11 are diagrams corresponding to the first, second and third embodiments, respectively.
Figure 10:
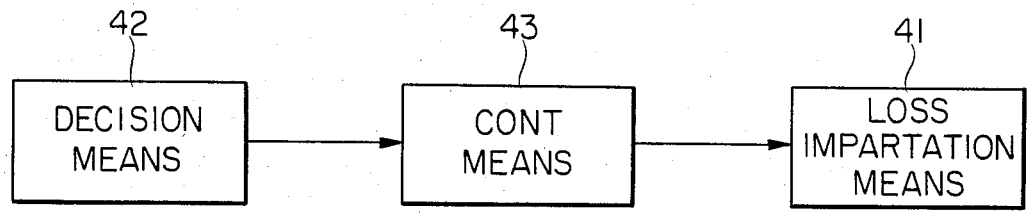
Figure 11:
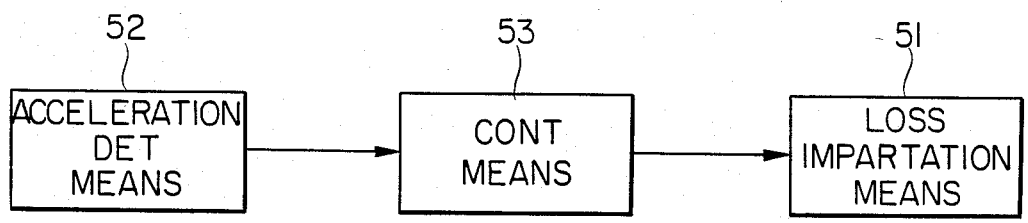

A third embodiment is intended to solve this drawback, and the arrangement thereof is shown in FIG. 8. Referring to the figure, an acceleration detector 26 is mounted on the bottom portion of the cage 10, and a control unit 27 for controlling the thyristor 25 on the basis of the output signal of this acceleration detector 26 is disposed. Here, the control unit 27 consists of an adder 27a and an amplifier 27b. The control unit 27 controls the thyristor 25 with a signal obtained by amplifying the deviation component between the output signal of the acceleration detector 26 and a speed command value, whereby vibrational components contained in the acceleration are suppressed to minimum magnitudes. Thus, the optimum damping can be realized.

This control unit 27 is realized by the foregoing control unit 13 and through arithmetic operations based on software.

In each of the foregoing embodiments, the attenuation of the vibrations is applied to the disc of the disc brake. In the elevator employing the gearless hoisting machine, however, it is sometimes difficult to afford the optimum damping because the rotational frequency of the disc is low. In order to solve this drawback, a disc which is driven through an over-drive gear may be separately disposed.

As apparent from the above description, according to the control apparatus of the present invention for an elevator, the optimum damping can be applied while the mechanical losses are kept low.

What is claimed is:

1. A control apparatus for an elevator wherein a cage is driven by a hoisting machine having an electric motor which is driven by A.C. electric power; comprising loss impartation means to impart a loss to the hoisting machine of the cage and being capable of adjusting the loss; cage position detection means to detect the position of the cage; and control means to control said loss impartation means on the basis of an output signal of said cage position detection means so as to adjust the loss in accordance with the position of the cage.

2. A control apparatus for an elevator as defined in claim 1, wherein the motor is supplied with electric power through a converter which coverts the electric power from an A.C. power source into D.C. power and an inverter which receives the D.C. output of said converter and inverts it into the A.C. power, and the motor driven by the A.C. output of said inverter, and wherein said control means also generates a signal for controlling said inverter.

3. A control apparatus for an elevator as defined in claim 1, wherein said loss impartation means comprises a rotary member which rotates with rotation of the hoisting machine and which can transmit a force to a rotary shaft of the hoisting machine, and means to provide said rotary member with a force to cause damping in the hoising machine.

4. A control apparatus for an elevator as defined in claim 3, wherein the hoisting machine has a brake for stopping the elevator car, and said rotary member of said loss impartation means is constructed of a rotary portion of said brake.

5. A control apparatus for an elevator as defined in claim 3, wherein said means to give said rotary member the force is constructed of eddy current generation means to generate an eddy current in said rotary member so as to brake said rotary member.

6. A control apparatus for an elevator as defined in claim 1, wherein said loss impartation means comprises a disc which is mounted on a rotary shaft of the hoisting machine and which rotates and operates with said rotary shaft, and eddy current generation means to generate an eddy current in said disc so as to provide a braking force, said eddy current generation means being constructed of electromagnets which are arranged in proximity to said disc.

7. A control apparatus for an elevator as defined in claim 6, wherein said electromagnets are supplied with electric power through an electrical control valve, and said electrical control valve is controlled by said control means so as to adjust the supply of the electric power to said electromagnets.

8. A control apparatus for an elevator as defined in claim 1, wherein said control means increases the loss by said loss impartation means when it decides, on the basis of an output signal of said cage position detection means, that the position of the cage is above a floor lying at the middle height of a building in which the elevator is installed.

9. A control apparatus for an elevator as defined in claim 8, wherein said control means reduces or removes the loss by said loss impartation means when it decides, on the basis of the output signal of said cage position detection means, that the cage lies below the middle floor.

10. A control apparatus for an elevator wherein a hoisting machine for a cage is controlled by a variable-voltage and variable-frequency power source; comprising loss impartation means capable of imparting a loss to the hoisting machine; decision means to decide whether or not an output frequency of the variable-voltage and variable-frequency power source is close to a resonance frequency of a rope system for suspending the cage; and control means to control said loss impartation means into a loss imparting state when the output frequency of the variable-voltage and variable-frequency power source is close to the resonance frequency of the rope system on the basis of a decision result of said decision means.

11. A control apparatus for an elevator as defined in claim 10, further comprising cage position detection means to detect the position of the cage, said decision means receiving an output signal of said cage position detection means so as to calculate the resonance frequency on the basis of this output signal and also receiving a speed command for an electric motor of the hoisting machine so as to calculate the output frequency of the power source on the basis of this command, to decide whether or not the resonance frequency and the output frequency are close to each other.

12. A control apparatus for an elevator as defined in claim 11, wherein said decision means evaluates a deviation between the resonance frequency and the output frequency and decides whether or not the deviation value is greater than a predetermined value, thereby to decide whether or not the output frequency is close to the resonance frequency.

13. A control apparatus for an elevator as defined in claim 10, wherein when said decision means has decided that the output frequency is close to the resonance frequency, it supplies said loss impartation means with a signal for increasing the loss.

14. A control apparatus for an elevator wherein a cage is driven by a hoisting machine having an electric motor which is driven by A.C. electric power; comprising loss impartation means capable of imparting a loss to the hoisting machine for the cage; acceleration detection means to detect an acceleration of the cage; and control means to control said loss impartation means on the basis of an output signal of said acceleration detection means so as to suppress vibrational components contained in the acceleration to minimum magnitudes.

15. A control apparatus for an elevator as defined in claim 14, wherein said acceleration detection means is disposed on the cage, and said control means generates a signal for the control of said loss impartation means on the basis of an deviation between the output signal of said acceleration detection means and a speed command for the motor.

* * * * *